United States Patent [19]

Harmony et al.

[11] Patent Number: 4,892,668

[45] Date of Patent: Jan. 9, 1990

[54] BLOOD COLLECTION BAG SUPPORT

[75] Inventors: Daniel C. Harmony, Tucson, Ariz.; Bradley T. Noble, Redondo Beach, Calif.

[73] Assignee: Engineering & Research Associates, Inc., Tucson, Ariz.

[21] Appl. No.: 253,687

[22] Filed: Oct. 5, 1988

[51] Int. Cl.$^4$ ........................ B01D 21/26; B04B 15/00

[52] U.S. Cl. ..................................... 210/782; 210/513; 210/787; 494/37; 494/45; 494/20; 494/21

[58] Field of Search ............ 210/782, 787, 789, 360.1, 210/361,512.1, 513, 514, 516, 380.1; 494/16, 20, 21, 37, 45; 446/153

[56] References Cited

U.S. PATENT DOCUMENTS

| | | | |
|---|---|---|---|
| 2,404,729 | 7/1946 | Hurt | 446/153 |
| 3,830,425 | 8/1974 | Stallmann | 494/45 |
| 4,316,576 | 2/1982 | Cullis et al. | 494/21 |
| 4,413,773 | 11/1983 | Rohde et al. | 494/21 |
| 4,439,177 | 3/1984 | Conway | 494/20 |
| 4,543,084 | 9/1985 | Bailey | 494/20 |
| 4,582,606 | 4/1986 | McCarty | 210/516 |
| 4,753,739 | 6/1988 | Noble | 210/787 |

*Primary Examiner*—W. Gary Jones
*Attorney, Agent, or Firm*—Cahill, Sutton & Thomas

[57] ABSTRACT

Isolation of a quantity of blood within a fold of a blood collection bag is prevented during centrifugation by applying a laterally oriented force against the blood collection bag to pressurize it and encourage unfolding of any folds. The laterally oriented force is generated by the apparent weight increase of the blood collection bag during centrifugation.

16 Claims, 3 Drawing Sheets

BLOOD COLLECTION BAG SUPPORT

CROSS REFERENCE TO RELATED APPLICATIONS

The present invention is related to an invention described in a copending application for U.S. patent entitled "BRIDGE FOR SUSPENDING A BLOOD COLLECTION BAG", Ser. No. 113,626, and filed on Oct. 26, 1987 and to U.S. Pat. No. 4,753,739, issued June 28, 1988, which application and patent are assigned to the present Assignee.

BACKGROUND OF THE INVENTION

1. Field of the Invention

The present invention relates to blood collection bag support systems and, more particularly, to apparatus for supporting a blood collection bag within a centrifuge cup.

2. Description of Prior Art

Blood collection bags of a certain size, shape and configuration have been employed by blood collection centers, hospitals and other medical facilities for decades to collect and store blood and components thereof. Typically, whole blood within a blood collection bag is centrifuged to separate the plasma, platelets, red blood cells and white blood cells. Industry standard centrifuges for this purpose include a plurality of cups for receiving and containing the blood collection bags during the centrifugation process.

During centrifugation of the blood collection bags, it is important that the blood collection bag and components associated therewith not be creased, folded or otherwise be configured to permit retention of a quantity of blood apart from the main body of blood. If such retention occurs, contamination of the separated blood components subsequent to centrifugation by mixing with the segregated quantity of whole blood could occur. It is therefore important to mount the blood collection bag within the centrifuge cup in such a manner that physical segregation of a quantity of blood within folded parts of a blood bag not occur. In the above identified related application and patent, apparatus supported by a centrifuge cup suspends a blood collection bag therefrom. Preformed apertures located at the upper end of the conventional blood collection bag and peripheral to the envelope portion containing the blood to be centrifuged are penetrably engaged by the apparatus. Such suspension discourages creasing or folding of the blood collection bag and segregated retention of a quantity of whole blood is prevented.

SUMMARY OF THE INVENTION

The present invention is directed to a centrifugal force sensitive envelope for maintaining a blood collection bag located in alignment with and in extended configuration along the longitudinal axis of a centrifuge cup. The envelope is flexible and includes a central compartment in fluid communication with a pair of opposed wings. In a centrifuge cup, the central compartment supports the bottom of the blood bag and the wings extend along opposed sides of the blood bag and adjacent the centrifuge cup. Upon centrifugation, the force imposed by the blood bag will compress the central compartment resulting in commensurate inflation of the wings. The inflated wings will compressively engage and pressurize the blood bag to cause any folded parts thereof to unfold and permit drainage of any whole blood lodged therein, whereby all of the blood becomes centrifuged and separated by weight into its components.

It is therefore a primary object of the present invention to provide positional support for a blood collection bag in a centrifuge cup to ensure centrifugation of all of the whole blood.

Another object of the present invention is to provide a blood bag weight responsive apparatus for supporting a blood bag within the cavity of a centrifuge cup.

Yet another object of the present invention is to provide an apparatus for imposing laterally oriented forces for supporting a blood collection bag in a centrifuge cup.

Still another object of the present invention is to provide a flexible envelope for supporting a blood collection bag within a centrifuge cup as a function of the centrifugal forces imposed upon the blood collection bag during centrifugation.

A further object of the present invention is to provide a non rigid support for supporting a blood collection bag within a centrifuge cup.

A yet further object of the present invention is provide a method for supporting a blood collection bag within a centrifuge cup to ensure centrifugation of all of the whole blood.

A still further object of the present invention is to provide a method for preventing folds in a blood collection bag disposed in a centrifuge cup during centrifugation.

These and other objects of the present invention will become apparent to those skilled in the art as the description thereof proceeds.

DESCRIPTION OF THE PREFERRED EMBODIMENT

Figure 1:
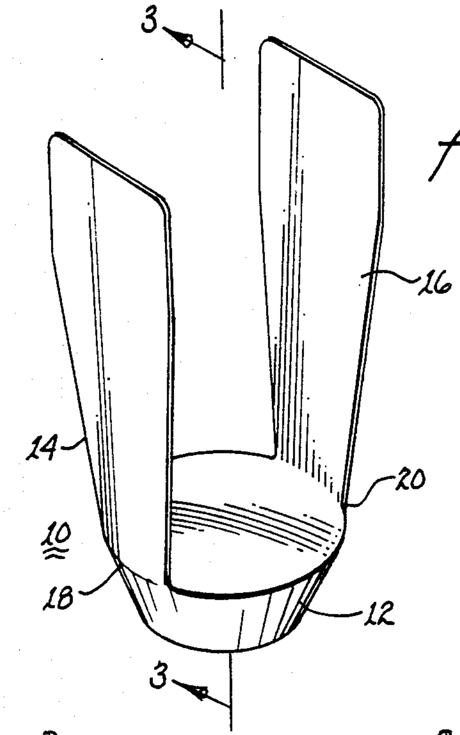
FIG. 1 illustrates an envelope in its operative configuration for supporting a blood collection bag within a centrifuge.

Referring to FIG. 1, there is illustrated, in representative form, an envelope 10 for supporting a blood collection bag within a centrifuge cup during centrifugation. Th envelope includes a hollow base 12 and a pair of wings 14, 16 extending from generally diametrically opposed locations on the base. Each of the wings is hollow and is in fluid communication with base 12 at the respective junctions 18, 20. The material of envelope 10 is flexible and pliant; it may be selected from the family of polyurethane sheet materials. The envelope is inflated to less than the fully inflated state. Thereby, compression of one part of the envelope will result in flow of fluid, usually a gas, from the compressed segment to the remaining segments and result in commensurate inflation of the remaining segments.

Figure 2:
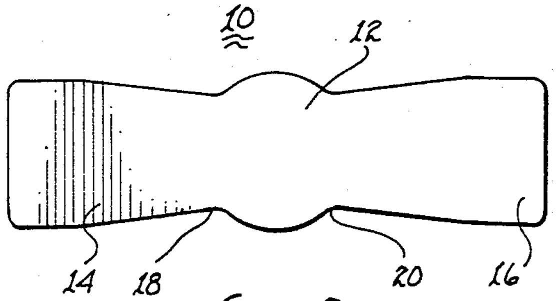
FIG. 2 illustrates a planform of the envelope.

As depicted in FIG. 2, envelope 10 may be constructed to be generally planar and resemble, in planform, a bow tie. Alternatively, wings 14 and 15 may be generally rectangular in planform or taper toward their respective ends. In the event envelope 10 is constructed generally planar, as depicted in FIG. 2, wings 14 and 16 would be bent upwardly at their respective junctions 18, 20 to resemble the configuration depicted in FIG. 1 upon placement of the envelope within the centrifuge cup.

Figure 3:
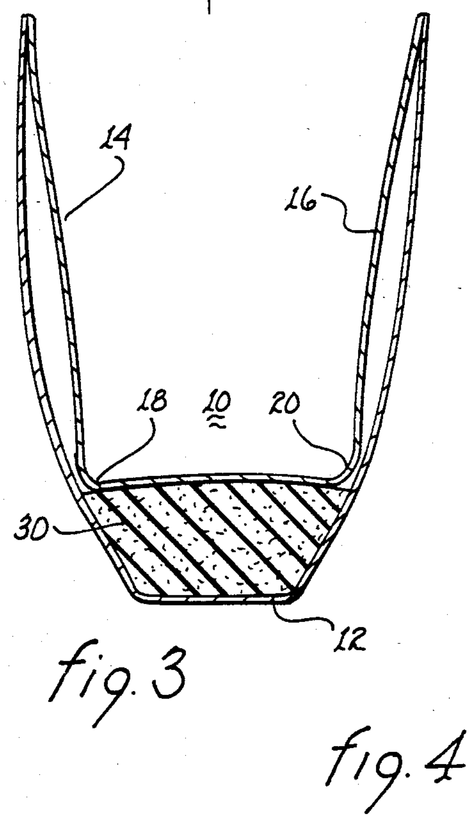
FIG. 3 is a cross sectional view taken along lines 3—3, as shown in FIG. 1.

As depicted in the cross sectional view shown in FIG. 3, bag 12 has disposed therein a compressible filler 30. Preferably, the filler has a good memory whereby it will attempt to resume its original shape and size subsequent to compression due to external forces. In the quiescent state, filler 30 will tend to provide a certain depth or thickness to base 12 which thickness is primarily a function of the configuration of the material defining the base. Upon expansion of the base in response to filler 30 when envelope 10 is in a free state, wings 14 and 16 will tend to be deflated as a result of the fluid flowing therefrom into the expanding base. Preferably, filler 30 should have good memory and for this reason may be a foam selected from the family of presently available silicon foams. With good memory of the filler, continued compression and expansion of the filler with commensurate compression and expansion of base 12 may be expected throughout the life of the material of which envelope 10 is made.

Figure 4:
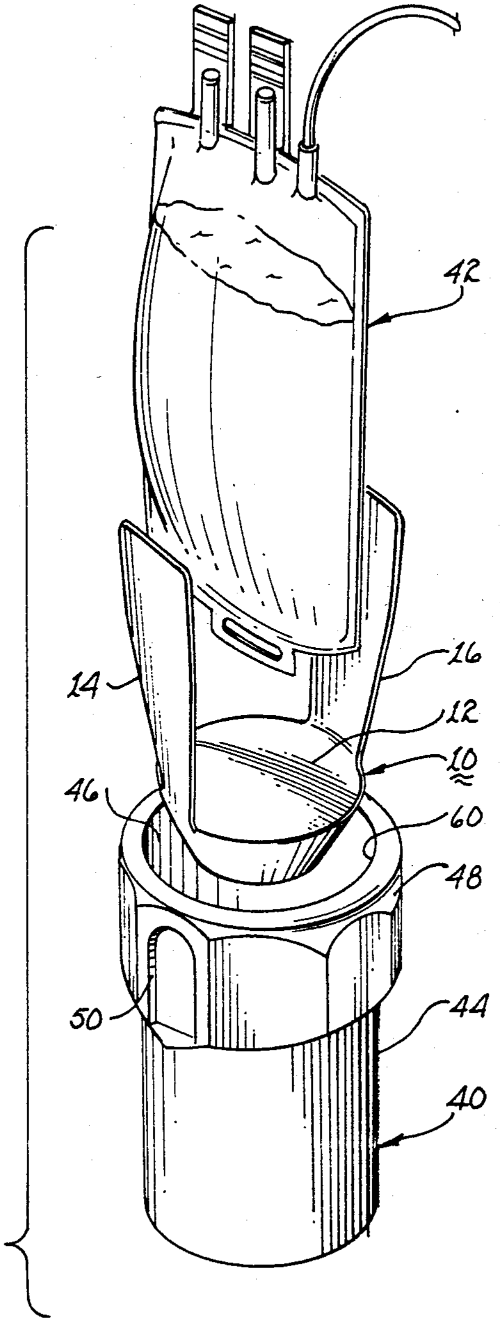
FIG. 4 illustrates loading of a centrifuge cup.
Figure 5:
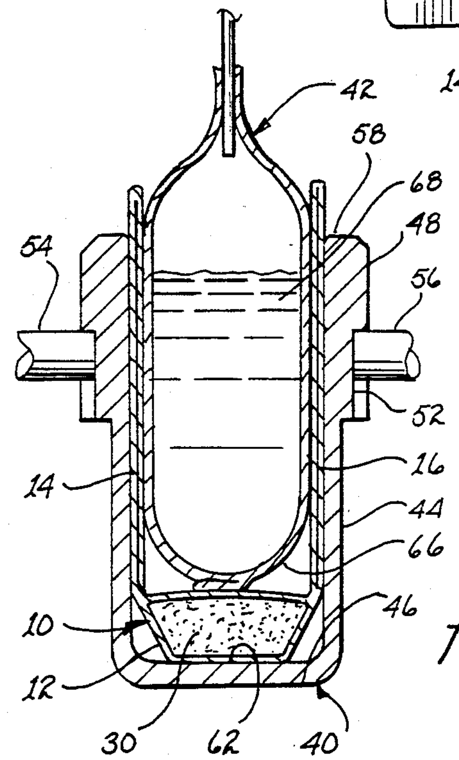
FIG. 5 is a partial cross sectional view illustrating the envelope in the initial state and supporting a blood collection bag within a centrifuge cup.

Referring jointly to FIGS. 4 and 5, the installation of envelope 10 within a centrifuge cup 40 to support a blood collection bag 42 will be described. The centrifuge cup, a standard article in the field of centrifugation, includes a cylindrical body 44 having a closed bottom and defining a cavity 46; the cavity may be cylindrical or tapered. It is to be understood that other configurations of the centrifuge cup are known and have been used. Generally, a collar 48 is formed about the upper end of the centrifuge cup, which collar may include diametrically opposed insets 50, 52. These insets are used to receive the respective ends of opposed studs 54, 56, of a yoke (not shown), which studs permit pivotal movement of the centrifuge cup about the longitudinal axis of the studs in response to the forces imposed during centrifugation. The upper end of the centrifuge cup includes an annular edge 58 which may lie in a plane perpendicular to the longitudinal axis of the centrifuge cup. Generally, a cylindrical surface 60 is formed within the major part of the centrifuge cup to define cavity 46. The lower end of the cavity is necessarily in conformance with the configuration of the bottom of the centrifuge cup.

Base 12 of envelope 10 may be in the form of an inverted truncated cone, as depicted, to generally conform with the bottom of the cavity within the centrifuge cup. After insertion of the envelope, with wings 14, 16 extending upwardly as depicted in FIG. 4, blood collection bag 42 is slid downwardly intermediate the wings. Alternatively, the blood collection bag may be enclosed by wings 14, 16 and against base 12 prior to insertion of the blood collection bag/envelope unit into centrifuge cup 40. Operator technique and circumstances may be the predominate criteria for the choice of insertion technique.

The relationship of the centrifuge cup, the envelope and the blood collection bag are depicted particularly in FIG. 5. By inspection, it will be apparent that lower end 66 of the blood collection bag will be supported upon base 12 of an envelope 10, which support is primarily provided by filler 30. The base, in turn, is supported upon bottom 62 of centrifuge cup 40. Wings 14 and 16 extend upwardly along opposed sides of blood bag 42; these wings may extend exterior of the cavity within the centrifuge cup, as illustrated, to assist in withdrawal of the blood collection bag. As is standard procedure, the blood collection bag is partially filled with whole blood 68 to be centrifuged. In addition, quantities of anticoagulant and preservatives are disposed within the blood bag. The weight of the fluids within the blood collection bag will tend to expand the sides of the blood collection bag against wings 14, 16 and result in partial or complete deflation of the wings. Necessarily, a balance of forces exists between the force tending to deflate the wings and the force resulting from the weight of the blood bag resting upon base 12. Accordingly, some deflation of the base may exist which would result in a partial inflation of the wings.

Figure 6:
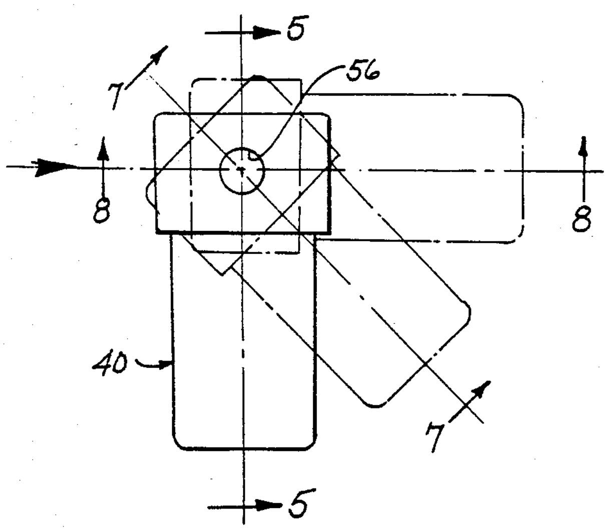
FIG. 6 illustrates the reorientation of a centrifuge cup during centrifugation.

Referring to FIG. 6, there is illustrated the function or operation of centrifuge cup 40 during centrifugation. Prior to centrifugation, centrifuge cup is suspended in depending relationship from studs 54, 56 in a near vertical position. As indicated by lines 5—5, the orientation of the centrifuge cup, the envelope and the blood collection bag are essentially vertical, as depicted in FIG. 5. Upon initiation of centrifugation, the yoke supporting studs 54, 56, will rotate about a vertical axis disposed to the left of the centrifuge cup as depicted in FIG. 6. The resulting centrifugal forces acting upon the centrifuge cup will cause it to swing or pivot through a 45° angle of inclination, represented by lines 7—7 and as depicted in FIG. 7, to a near horizontal position as depicted in FIG. 8 and represented by lines 8—8.

Figure 7:
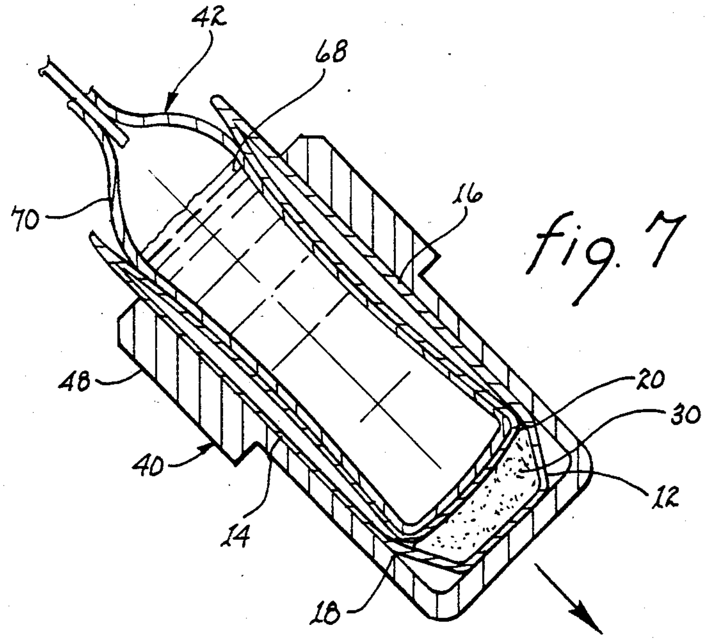
FIG. 7 illustrates the initial change in the envelope configuration as centrifugation begins.

When the centrifuge cup is at approximately a 45° angle, as depicted in FIG. 7, the centrifugal forces acting upon blood collection bag 42, blood 68 and other liquids therein, will tend to compress filler 30 within base 12. Compression of the base will cause the fluid, usually a gas, disposed therein to flow through junctions 18, 20 into wings 14, 16, respectively. The resulting expansion of the wings will tend to compress the lateral sides of the blood collection bag. Compression of the lateral sides of the collection bag will place the contents within the collection bag under pressure. The resulting pressure will tend to unfold any portions or parts of upper portion 70 of the blood collection bag which may have become folded over during or subsequent to installation of the blood collection bag within the centrifuge cup. Invariably, such folded over parts contain an amount of blood, which, due to the centrifugation process, will usually tend not to become mixed with the bulk of the blood within the blood collection bag. However, by unfolding the folded part, the blood that may be contained therein is caused by the centrifugal forces imposed to flow downwardly and become a part of the main body of blood within the blood collection bag. Accordingly, the laterally imposed forces resulting from inflation of wings 14 and 16 will tend to minimize or eliminate the presence of any pockets of blood within upper portion 70 of the blood collection bag.

Figure 8:
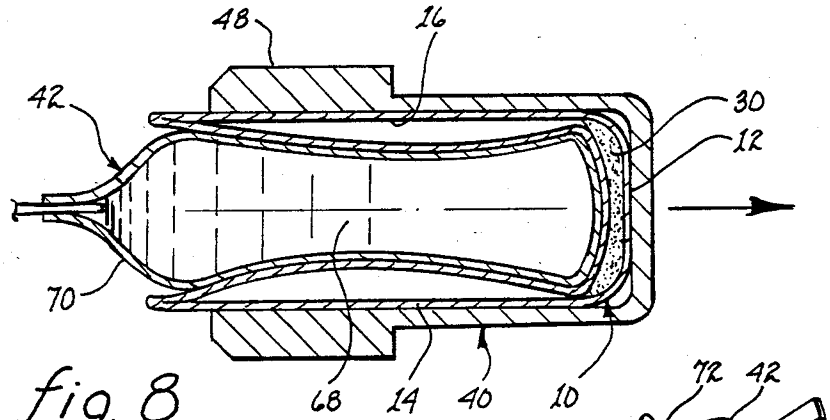
FIG. 8 illustrates the final configuration of the envelope to support the blood collection bag during centrifugation.

Upon further centrifugation, centrifuge cup 40 will become generally horizontally oriented, as depicted in FIG. 8. In this configuration, the centrifugal forces acting upon the contents of blood collection bag 42 will exert substantial forces tending to compress filler 30 within base 12 of envelope 10. The compression of the base will, as discussed above, cause further inflation of wings 14, 16 to further increase the laterally imposed forces upon the blood collection bag. The resulting further pressure within the blood collection bag will further insure against the likelihood of continuing existence of any folded portions of upper portion 70 or other part of the blood collection bag from continuing to retain blood which is not centrifuged as part of the main body of blood 68.

On completion of the centrifugation process, centrifuge cup 40 will resume its generally vertical state, as depicted in FIG. 5. At this point, the centrifuge cup may be disengaged from the centrifuge with prior or subsequent removal of the blood bag. Such removal may be effected by pulling upwardly upon the extending ends of wings 14 and 16 to remove the blood collection bag and the envelope as a unit. Alternatively, upper portion 70 of the blood collection bag may be gripped and pulled out independently of the envelope.

Figure 9:
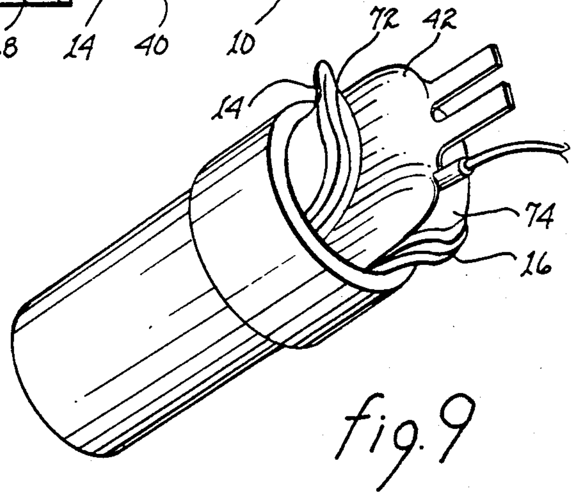
FIG. 9 illustrates housing of satellite bags with the blood collection bag in the centrifuge cup.

Usually, blood collection bags 42 include a plurality of satellite bags or pouches attached thereto by tubing. These pouches, identified by reference numerals 72, 74, may be located adjacent blood collection bag 42 in proximity to wings 14 and/or 16, as shown in FIG. 9. Alternatively, the pouches may be stuffed in a non adjacent relationship with the wings.

Prior art devices for supporting or suspending a blood collection bag within a centrifuge cup were generally of metal or of relatively robust manmade plastic materials. Such materials, in the event of an accident during centrifugation, might become lethal and/or cause substantial damage to any equipment which might be struck by components of the blood bag support devices. Because of the necessary rigidity of prior art support devices, damage and potential inoperability might result from rough handling or mishandling or inadequate storage facilities. Envelope 10, being flexible, compressible, foldable and otherwise generally pliant, can be handled and stored in almost any manner without any serious expectation of damage to it. Moreover, in the event of an accident, the non rigidity of envelope 10 will tend to substantially lessen the degree of injury or damage that might result. Because the costs attendant envelope 10 are relatively modest compared to prior art devices, it is not unthinkable to consider envelope 10 in the manner of a disposable item. Due to severe mishandling or accident, the envelope might become punctured, which puncture would destroy its capability of functioning as intended; however, because of the relative low cost of the envelope, it can be discarded and replaced at nominal cost.

While envelope 10 was created primarily to support blood collection bags within a centrifuge cup during centrifugation of the blood, it is certainly conceivable to consider use of the concept embodied in envelope 10 to support various other items or materials when increased lateral support is desired as a function of longitudinally oriented forces or pressures imposed. Moreover, the extend of the quantity of the filler material within the base and the volume represented by the base can readily be varied to accommodate special situations or requirements. Furthermore, under certain conditions it may be desirable to incorporate a compressible filler having memory within the wings with or without a filler in the base. Various configurations of envelope 10 are also contemplated, which configurations are primarily a function of the purpose and support function to be served.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirement without departing from those principles.

We claim:

1. Apparatus for supporting a filled blood collection bag within a cavity of a centrifuge cup during centrifugation of the blood, said apparatus comprising in combination:

(a) a compressible hollow base locatable adjacent the bottom of the centrifuge cup cavity for establishing longitudinally oriented support for the blood collection bag;

(b) a pair of inflatable hollow wings extending from said base adjacent the interior sides of the centrifuge cup cavity and positionable adjacent opposed sides of the blood collection bag for exerting laterally oriented forces on the blood collection bag during inflation of said wings; and (c) means for providing fluid communication between said base and each of said wings to inflate said wings in response to compression of said base.

2. The apparatus as set forth in claim 1 wherein said base includes a compressible filler for urging inflation of said base and commensurate deflation of said wings.

3. The apparatus as set forth in claim 2 wherein said pair of wings extend in opposed directions from said base.

4. The apparatus as set forth in claim 3 wherein said wings increase in width as a function of the distance from said base.

5. The apparatus as set forth in claim 3 wherein said base is shaped as a truncated cone in the inflated state.

6. A method for supporting a blood collection bag within a centrifuge cup, said method comprising the steps of:

(a) supporting the lower end of the blood collection bag upon a compressible member within the centrifuge cup;

(b) deflating the compressible member in response to an apparent increase in weight of the blood collection bag resulting from the centrifugal forces occurring during centrifugation of the blood collection bag;

(c) imposing forces upon at least one side of the blood collection bag with an inflatable member; and (d) transmitting a flow of fluid from the compressible member to the inflatable member in response to operation of said step of imposing.

7. The method as set forth in claim 6 including the step of urging expansion of the compressible member to inflate it.

8. The method as set forth in claim 6 wherein said step of imposing includes the step of imposing forces upon opposed sides of the blood collection bag with a pair of inflatable members.

9. The method as set forth in claim 8 wherein said step of transmitting includes the step of transmitting a flow of fluid between the compressible member and each of the pair of inflatable members in response to deflation and inflation of the compressible member.

10. The method as set forth in claim 9 including the step of urging expansion of the compressible member to inflate it.

11. The method as set forth in claim 8 including the step of locating the compressible member adjacent the bottom of the centrifuge cup and the step of positioning the pair of inflatable members adjacent opposed inner sides of the centrifuge cup.

12. The method as set forth in claim 6 including the step of locating the compressible member adjacent the bottom of the centrifuge cup and the step of positioning the inflatable member adjacent the inner side of the centrifuge cup.

13. A method for preventing isolation of a quantity of blood within one or more folds of a blood collection bag during centrifugaiton after placement of the blood collection bag within a centrifuge cup, said method comprising the steps of:

(a) generating a source of fluid under pressure during the centrifugation process; and (b) imposing a force upon a side of the blood collection bag in response to said step of generating to pressurize the interior of the blood collection bag and urge unfolding of any folds of the blood collection bag to permit drainage therefrom of any contained blood in response to the centrifugal forces imposed.

14. The method as set forth in claim 13 wherein said step of generating is responsive to the apparent increase in weight of the blood collection bag during centrifugation.

15. The method as set forth in claim 13 wherein said step of imposing includes the step of imposing a force upon opposed sides of the blood collection bag.

16. The method as set forth in claim 15 wherein said step of generating is responsive to the apparent increase in weight of the blood collection bag during centrifugation.

* * * * *